(12) United States Patent
Soneda et al.

(10) Patent No.: US 6,806,992 B2
(45) Date of Patent: Oct. 19, 2004

(54) MICRO MIRROR UNIT INCLUDING MIRROR SUBSTRATE AND WIRING SUBSTRATE SPACED BY CONDUCTIVE SPACER

(75) Inventors: Hiromitsu Soneda, Kawasaki (JP); Satoshi Ueda, Kawasaki (JP); Hisao Okuda, Kawasaki (JP); Ippei Sawaki, Kawasaki (JP); Osamu Tsuboi, Kawasaki (JP); Yoshihiro Mizuno, Kawasaki (JP); Norinao Kouma, Kawasaki (JP); Yoshitaka Nakamura, Suzaka (JP); Fumio Yamagishi, Kawasaki (JP)

(73) Assignees: Fujitsu Limited, Kawasaki (JP); Fujitsu Media Devices Limited, Suzaka (JP)

( * ) Notice: Subject to any disclaimer, the term of this patent is extended or adjusted under 35 U.S.C. 154(b) by 0 days.

(21) Appl. No.: 10/331,500

(22) Filed: Dec. 31, 2002

(65) Prior Publication Data

US 2003/0218793 A1 Nov. 27, 2003

(30) Foreign Application Priority Data

May 24, 2002 (JP) ........................................ 2002-151549

(51) Int. Cl.⁷ .............................................. G02B 26/00
(52) U.S. Cl. ...................... 359/291; 359/247; 359/223
(58) Field of Search ................................. 359/223–226, 359/212, 214, 247, 254, 290–91, 296

(56) References Cited

U.S. PATENT DOCUMENTS

| 6,061,323 A | 5/2000 | Jerman et al. ........... 369/13.32 |
| 6,271,955 B1 * | 8/2001 | Atobe et al. ................. 359/291 |
| 6,431,714 B1 * | 8/2002 | Sawada et al. ............. 359/879 |
| 6,720,682 B2 * | 4/2004 | Hatam-Tabrizi et al. ...... 310/12 |
| 2002/0050744 A1 | 5/2002 | Berstein et al. ............... 310/12 |
| 2002/0054422 A1 | 5/2002 | Carr et al. .................... 359/291 |
| 2002/0131146 A1 * | 9/2002 | Gee et al. .................... 359/291 |
| 2003/0007262 A1 * | 1/2003 | Tsuboi et al. ............... 359/847 |
| 2003/0169962 A1 * | 9/2003 | Rajan et al. .................. 385/18 |

FOREIGN PATENT DOCUMENTS

| JP | 11-142753 | 5/1999 |
| WO | 00/20899 | 4/2000 |

OTHER PUBLICATIONS

Schenk, H. et al., "A resonantly excited 2D–micro–scanning–mirror with large deflection," Sensors and Actuators A, vol. 89, No. 1–2, Mar. 20, 2001, pp. 104–111.

Michalicek, Adrian M., "Flip–chip fabrication of advanced micro–mirror arrays," Sensors and Actuators A, vol. 95, No. 2–3, Jan. 1, 2002, pp. 152–167.

* cited by examiner

Primary Examiner—Jordan M. Schwartz
Assistant Examiner—Jessica Stultz
(74) Attorney, Agent, or Firm—Staas & Halsey LLP

(57) ABSTRACT

A micro mirror unit includes a micro mirror substrate, a wiring substrate and an electroconductive spacer disposed between these substrates. The micro mirror substrate includes a moving part, a frame and torsion bars connecting the moving part to the frame. The moving part is provided with a mirror-formed portion. The wiring substrate is formed with a wiring pattern. The electroconductive spacer electrically connects the frame to the wiring pattern, while also providing a space between the micro mirror substrate and the wiring substrate.

18 Claims, 17 Drawing Sheets

FIG.2
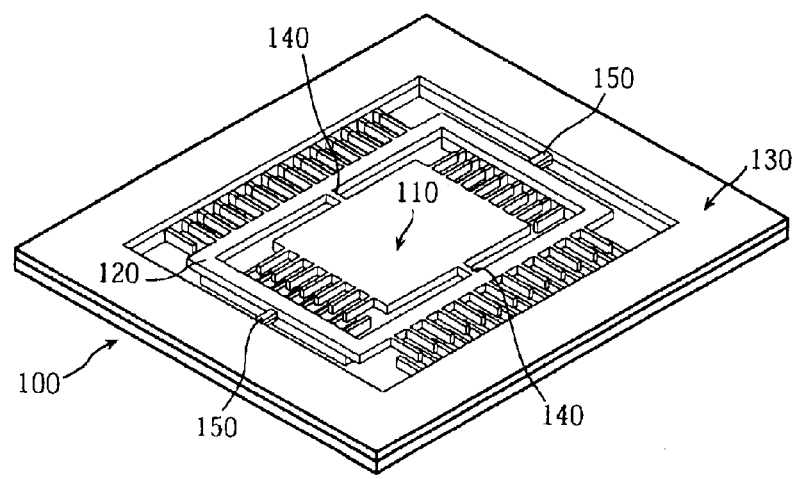
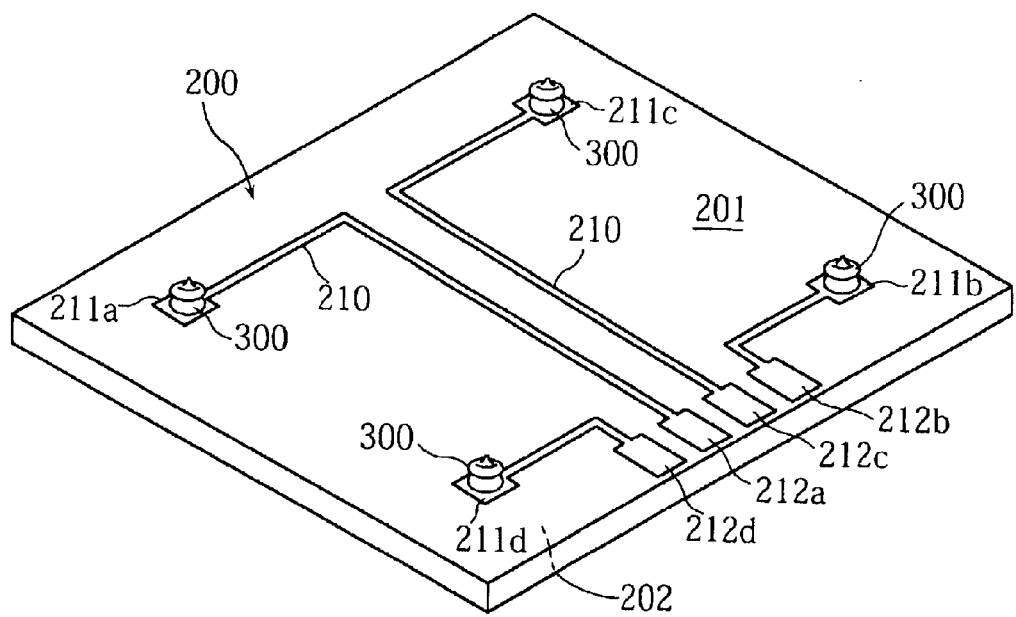

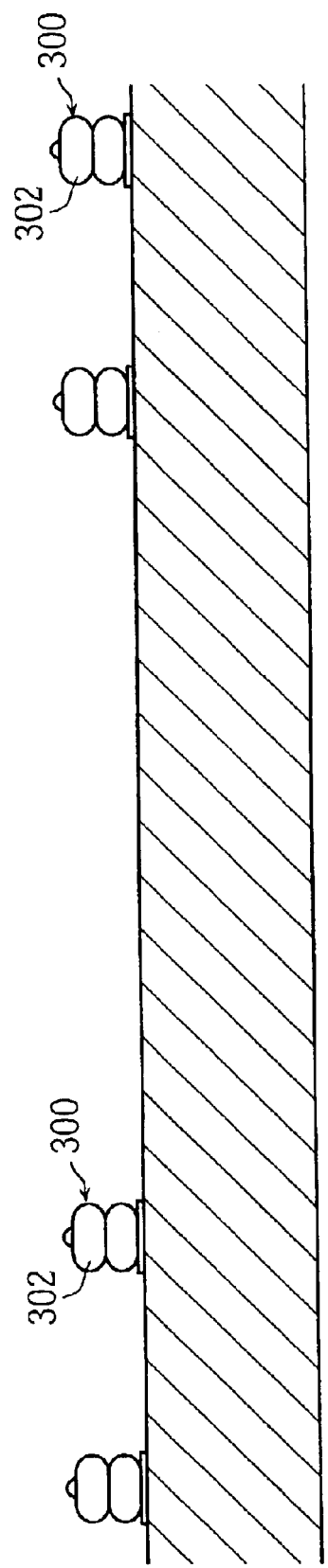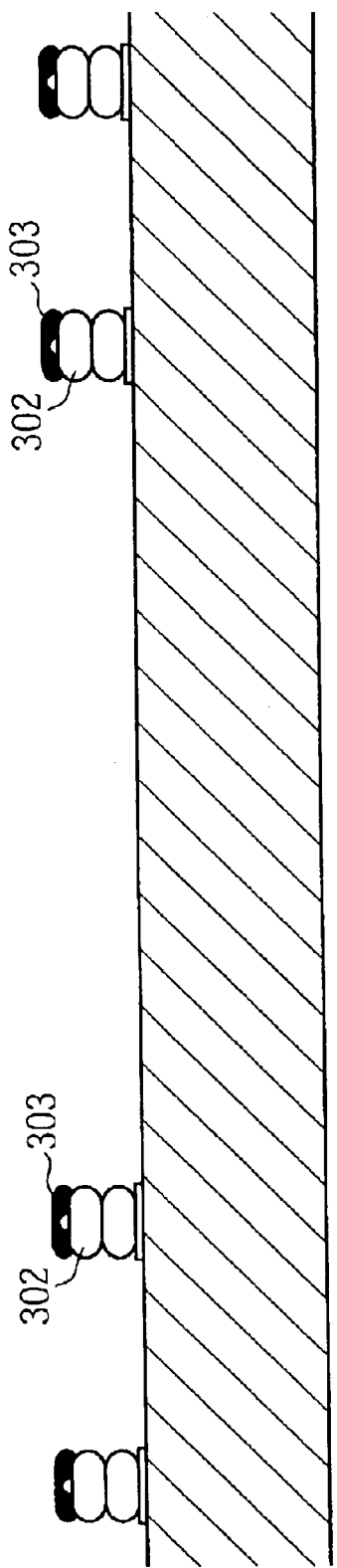

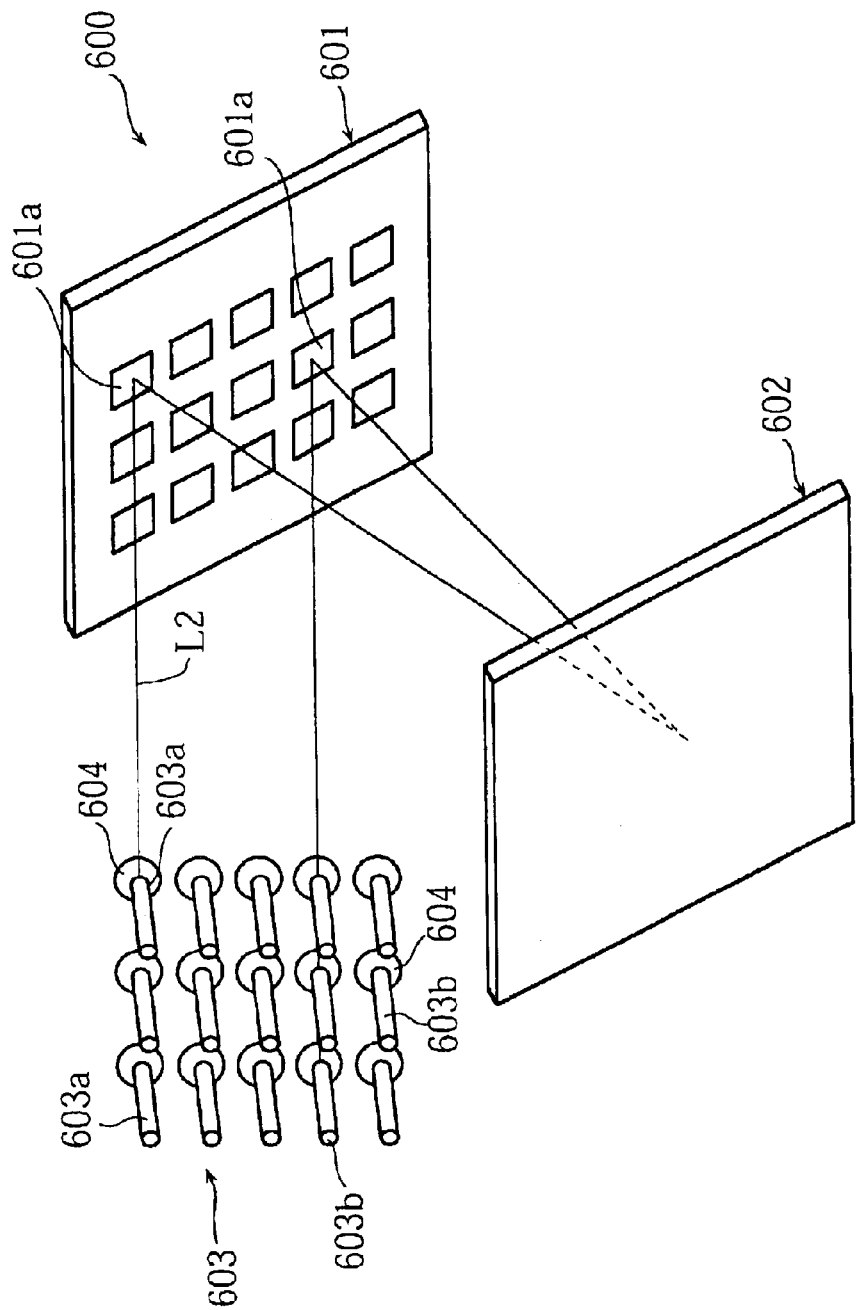

MICRO MIRROR UNIT INCLUDING MIRROR SUBSTRATE AND WIRING SUBSTRATE SPACED BY CONDUCTIVE SPACER

BACKGROUND OF THE INVENTION

1. Field of the Invention

The present invention relates to a micro mirror unit to be used in e.g. an optical switching device for switching optical paths provided by optical fibers.

2. Description of the Related Art

In recent years, optical communications technology is utilized widely in a variety of fields. In the optical communications, optical fibers serve as a medium through which optical signals are passed. When the optical signal passing through a given optical fiber is switched to another optical fiber, so-called optical switching devices are used. In order to achieve high quality optical communications, the optical switching device must have such characteristics as high capacity, high speed and high reliability in switching action. In view of these, micro mirror units manufactured by micro-machining technology are very popular as a switching element to be incorporated in the optical switching device. The micro mirror units enable the switching operation without converting optical signals into electric signals between the optical paths on the input side and the output side of the optical switching device. This is advantageous to achieving the above-mentioned characteristics.

Optical switching devices utilizing micro mirror units manufactured by micro-machining technologies are disclosed, for example, in International Publication WO00/20899, and the article *Fully Provisioned 112×112 Micro-Mechanical Optical Crossconnect with 35.8Tb/sec Demonstrated Capacity* (Proc. 25$^{th}$ Optical Fiber Communication Conf. Baltimore. PD12(2000).

FIG. 18 outlines an ordinary optical switching device 500. The optical switching device 500 includes a pair of micro mirror arrays 501, 502, an input fiber array 503, an output fiber array 504, and a plurality of micro lenses 505, 506. The input fiber array 503 includes a predetermined number of input fibers 503a. The micro mirror array 501 is provided with the same number of micro mirror units 501a each corresponding to one of the input fibers 503a. Likewise, the output fiber array 504 includes a predetermined number of input fibers 504a. The micro mirror array 502 is provided with the same number of micro mirror units 502a each corresponding to one of the output fibers 504a. Each of the micro mirror units 501a, 502a has a mirror surface to reflect light. The orientation of the mirror surface is controllable. Each of the micro lenses 505 faces an end of a corresponding input fiber 503a. Likewise, each of the micro lenses 506 faces an end of a corresponding output fiber 504a.

In transmitting optical signals, lights L1 coming out of the input fiber array 503a pass through the corresponding micro lenses 505, thereby becoming parallel to each other and proceeding to the micro mirror array 501. The lights L is reflected on their corresponding micro mirror units 501a respectively, thereby directed toward the micro mirror array 502. The mirror surfaces of the micro mirror unit 501a are oriented, in advance, in appropriate directions so as to direct the light L1 to enter the desired micro mirror units 502a. Then, the light L1 is reflected on the micro mirror units 502a, and thereby directed toward the output fiber array 504. The mirror surfaces of the micro mirror units 502a are oriented, in advance, in appropriate directions so as to direct the light L1 to the desired output fibers 504a.

As described, according to the optical switching device 500, the light L1 coming out of the input fibers 503a reaches the desired output fibers 504a due to the reflection by the micro mirror arrays 501, 502. In this manner, a given input fiber 503a is linked to the relevant output fiber 504a in a one-to-one relationship. By appropriately changing the orientation, of the micro mirror units 501a, 502a, switching can be performed and the light L1 can be directed toward the selected output fiber 504a.

FIG. 19 outlines another ordinary optical switching device 600. The optical switching device 600 includes a micro mirror array 601, a fixed mirror 602, an input-output fiber array 603, and a plurality of micro lenses 604. The input-output fiber array 603 includes a number of input fibers 603a and output fibers 603b. The micro mirror array 601 includes the same number of micro mirror units 601a each corresponding to one of the fibers 603a, 603b. Each of the micro mirror units 601a has a mirror surface for reflection of light, the orientation of the mirror surfaces being controllable. Each of the micro lenses 604 faces an end of a corresponding one of the fibers 603a, 603b.

In transmitting optical signals, light L2 coming out of the input fiber 603a passes through the corresponding micro lens 604 and is directed toward the micro mirror array 601. The light L2 is then reflected by a corresponding first micro mirror unit 601a, and thereby directed toward the fixed mirror 602, reflected by the fixed mirror 602, and then enters a corresponding second micro mirror unit 601a. The mirror surface of the first micro mirror unit 601a is oriented, in advance, in a predetermined direction so as to direct the light L2 to enter a selected one of the micro mirror units 601a. Then, the light L2 is reflected on the second micro mirror unit 601a, and thereby directed toward the input-output fiber array 603. The mirror surface of the second micro mirror unit 601a is oriented, in advance, in a predetermined direction so as to direct the light L2 to enter a predetermined one of the output fibers 603b.

As described, according to the optical switching device 600, the light L2 coming out of the input fiber 603a reaches the desired output fiber 603b due to the reflection by the micro mirror array 601 and the fixed mirror 602. In this manner, a given input fiber 603a is linked to the relevant output fiber 603b in a one-to-one relationship. With this arrangement, by appropriately changing the orientation of the first and the second micro mirror units 601a, switching can be performed and the light L2 can be directed toward the selected output fiber 603b.

According to the optical switching devices 500, 600 as described above, the number of fibers increases with increase in the size of optical communications network. This means that the number of micro mirror units, or mirror surfaces, incorporated in the micro mirror array also increases. With a greater number of mirror surfaces, a greater amount of wiring is required to drive the mirror surfaces and therefore, an increased amount of area must be provided for the wiring per micro mirror array. If the mirror surfaces and the wiring pattern are to be formed in the same substrate, an increased amount of wiring requires an increased pitch between the mirror surfaces. As a result, the substrate itself or the micro mirror array as a whole must be big. In addition, an increase in the number of mirror surfaces tends to make it difficult to form the mirror surfaces together with the wiring pattern in the same substrate.

SUMMARY OF THE INVENTION

The present invention has been proposed under the circumstances described above. It is therefore an object of the present invention to provide a micro mirror unit capable of reducing the size-increasing tendency resulting from the increase in the number of mirror surfaces.

According to a first aspect of the present invention, there is provided a micro mirror unit provided with: a micro mirror substrate that includes a moving part, a first frame and torsion bars connecting the moving part to the frame, the moving part being provided with a mirror-formed portion; a wiring substrate formed with a wiring pattern; and an electroconductive spacer for electrically connecting the frame to the wiring pattern and for spacing the micro mirror substrate and the wiring substrate apart from each other.

With the above arrangement, the moving part (carrying a mirror portion) is provided in one substrate, and the wiring necessary to operate the moving part in another. This allows the micro mirror unit to be smaller than when the moving part and the wiring are provided on the same substrate. With the use of the electroconductive spacer, the spaced mirror and wiring substrates can be electrically connected to each other. Further, since the mirror substrate (in which the moving part is provided) is spaced apart from the wiring substrate by the spacer, the moving part can pivot properly without interfering with the wiring substrate.

According to a second aspect of the present invention, there is provided a micro mirror unit provided with: a micro mirror substrate formed integral with a plurality of micro mirror elements each including a moving part, a frame and torsion bars connecting the moving part to the frame, the moving part being provided with a mirror-formed portion; a wiring substrate formed with a wiring pattern; and an electroconductive spacer for electrically connecting the frame to the wiring pattern and for spacing the micro mirror substrate and the wiring substrate apart from each other.

Preferably, the electroconductive spacer may consist of a single bump or a plurality of stacked bumps.

Preferably, the electroconductive spacer may be connected to at least one of the wiring pattern and the frame via an electrode pad or electroconductive adhesive.

Preferably, the electroconductive spacer and the electrode pad may be fused to each other or press-contacted with each other.

Preferably, the wiring substrate may have a first surface facing the micro mirror substrate, and the first surface may be formed with a retrieved portion for accommodation of the moving part.

Preferably, the wiring substrate may have a second surface opposite to the first surface, and the second surface may be formed with part of the wiring pattern.

Preferably, the wiring substrate may include an electrical conductor penetrating through the wiring substrate for electrical connection between the wiring pattern formed in the first surface and the wiring pattern formed in the second surface.

Preferably, the micro mirror substrate and the wiring substrate may be fixed to each other by an adhesive.

Preferably, the micro mirror unit of the present invention may further include an additional spacer intervening between the frame and the wiring substrate. The additional spacer may be a bump.

Preferably, the moving part may be provided with a first comb-like electrode, while the frame may be provided with a second comb-like electrode for operation of the moving part by static electric force generated between the first and the second comb-like electrodes.

Preferably, the moving part may include a relay frame connected to the first-mentioned frame via the torsion bars, a mirror-formed portion spaced from the relay frame, and relay torsion bars connecting the relay frame and the mirror-formed portion to each other. The relay torsion bars may extend in a direction crossing the direction in which the torsion bars extend.

Preferably, the mirror-formed portion may include a third comb-like electrode, while the relay frame may include a fourth comb-like electrode for operation of the mirror-formed portion by static electric force generated between the third and the fourth comb-like electrodes.

Preferably, the micro mirror substrate may include a plurality of divisions insulated from each other by at least one of an insulating film and a gap, part of the divisions being electrically connected to the electroconductive spacer.

Other features and advantages of the present invention will become apparent from the detailed description given below with reference to the accompanying drawings.

BRIEF DESCRIPTION OF THE DRAWINGS

FIG. 2 is an exploded perspective view of the micro mirror unit of FIG. 1;

FIGS. 9–14 show manufacturing steps following the step shown in FIG. 8;

FIG. 19 illustrates another conventional optical switching device.

DETAILED DESCRIPTION OF THE PREFERRED EMBODIMENT

Preferred embodiments of the present invention will be described below with reference to the accompanying drawings.

Figure 1:
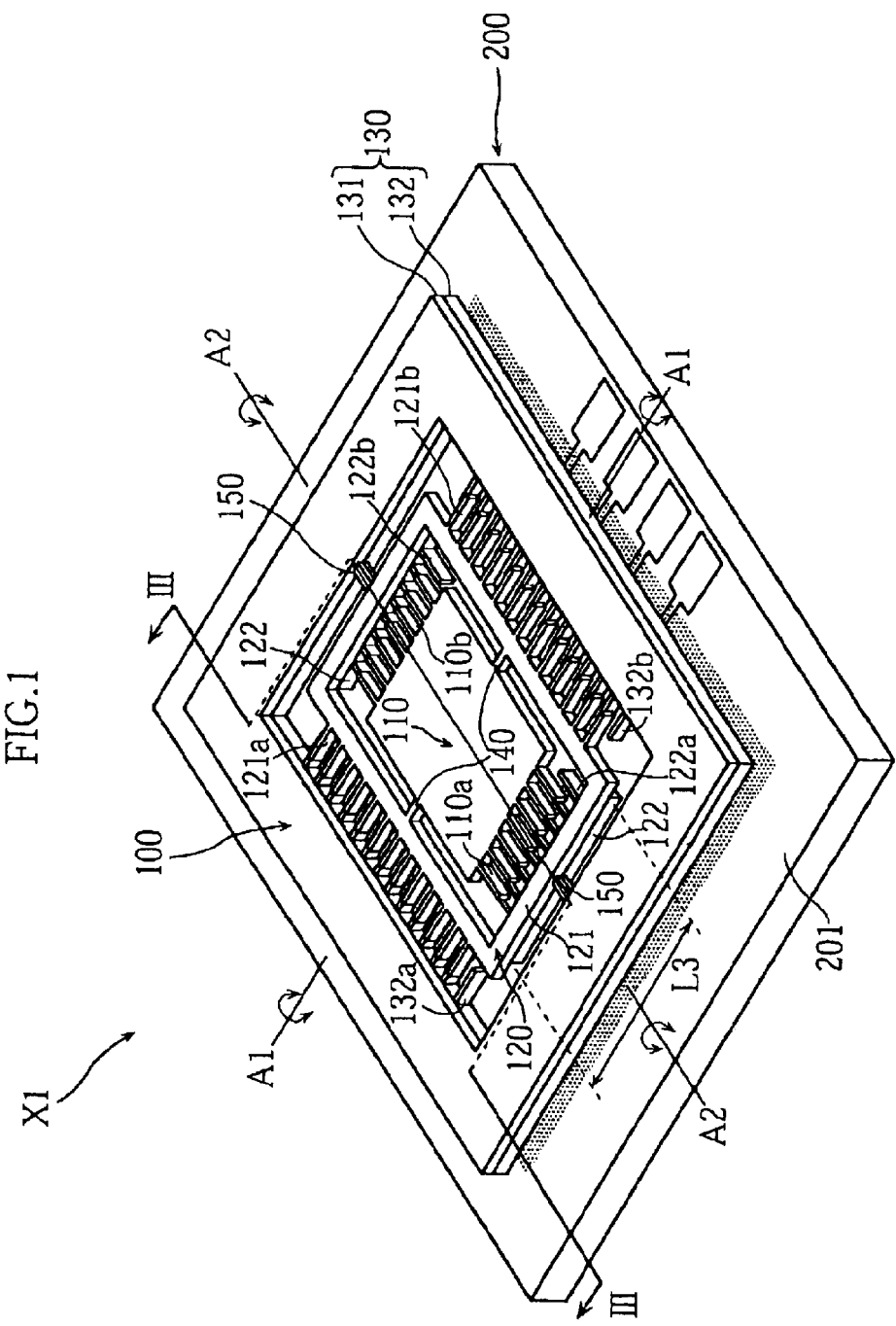
FIG. 1 is a perspective view of a micro mirror unit according to a first embodiment of the present invention.
Figure 3:
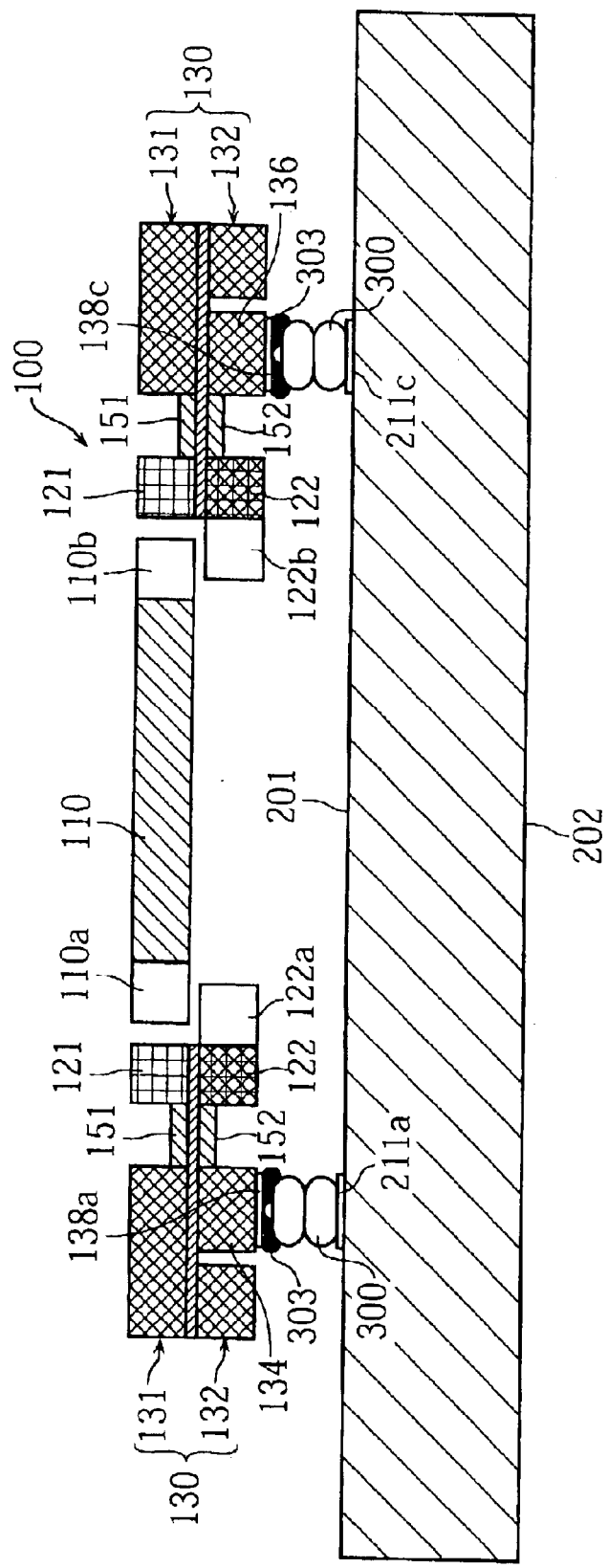
FIG. 3 is a sectional view of the micro mirror unit taken along lines III—III in FIG. 1.

FIG. 1 is a perspective view of a micro mirror unit X1 according to a first embodiment of the present invention. FIG. 2 is an exploded perspective view of the micro mirror unit X1. FIG. 3 is a sectional view taken along lines III—III in FIG. 1.

The micro mirror unit X1 includes a micro mirror substrate 100, a wiring substrate 200, and electroconductive spacers 300 between these substrates. The micro mirror substrate 100 includes a mirror-formed portion 110, an inner frame 120 surrounding it, an outer frame 130 surrounding the inner frame 120, a pair of torsion bars 140 connecting the mirror-formed portion 110 to the inner frame 120, and a pair of torsion bars 150 connecting the inner frame 120 to the outer frame 130. The pair of torsion bars 140 defines a pivotal axis A1 for the mirror-formed portion 110 to pivot with respect to the inner frame 120. The pair of torsion bars 150 defines a pivotal axis A2 for the inner frame 120, as well as for the associating mirror-formed portion 110, to pivot with respect to the outer frame 130. The pivotal axis A1 and the pivotal axis A2 are perpendicular to each other. In this manner, the micro mirror substrate 100 provides a biaxial micro mirror.

The micro mirror substrate 100 according to the present embodiment is formed by way of micro-machining technology, from an SOI (Silicon on Insulator) wafer having a multi-layer structure including a first silicon layer having a thickness of 100 $\mu$m, a second silicon layer having a thickness of 100 $\mu$m, and an insulating layer having a thickness of 1 $\mu$m. Specifically, the micro mirror substrate 100 is formed by photolithography, a dry etching technique such as DRIE (Deep Reactive Ion Etching) or a wet etching technique, so as to remove prescribed portions from the first silicon layer, the second silicon layer and the insulating layer. The silicon that provides the first silicon layer and the second silicon layer is doped with n-type impurity such as P and As or with p-type impurity such as B, to give electrical conductivity. According to the present invention, the micro mirror substrate 100 may be made from a different material substrate.

The mirror-formed portion 110 has an upper surface formed with a thin mirror layer (not illustrated). Further, the mirror-formed portion 110 has two side surfaces opposite to each other that are formed with comb-like electrodes 110a, 110b respectively. The mirror-formed portion 110 originates from the first silicon layer.

The inner frame 120 has a multi-layer structure including an inner frame main portion 121, a pair of electrode bases 122 and an insulating layer between them. The inner frame main portion 121 and the electrode bases 122 are electrically separated. The pair of electrode bases 122 are formed respectively with inwardly extending comb-like electrodes 122a, 122b. The inner frame main portion 121 has outwardly extending comb-like electrodes 121a, 121b. The comb-like electrodes 122a, 122b are below the comb-like electrodes 110a, 110b of the mirror-formed portion 110 so as not to interfere with the comb-like electrodes 110a, 110b when the mirror-formed portion 110 pivots. The inner frame main portion 121 originates from the first silicon layer whereas the electrode bases 122 originate from the second silicon layer.

Each of the torsion bars 140, connected to the mirror-formed portion 110 and to the inner frame main portion 121, originates from the first silicon layer.

Figure 4:
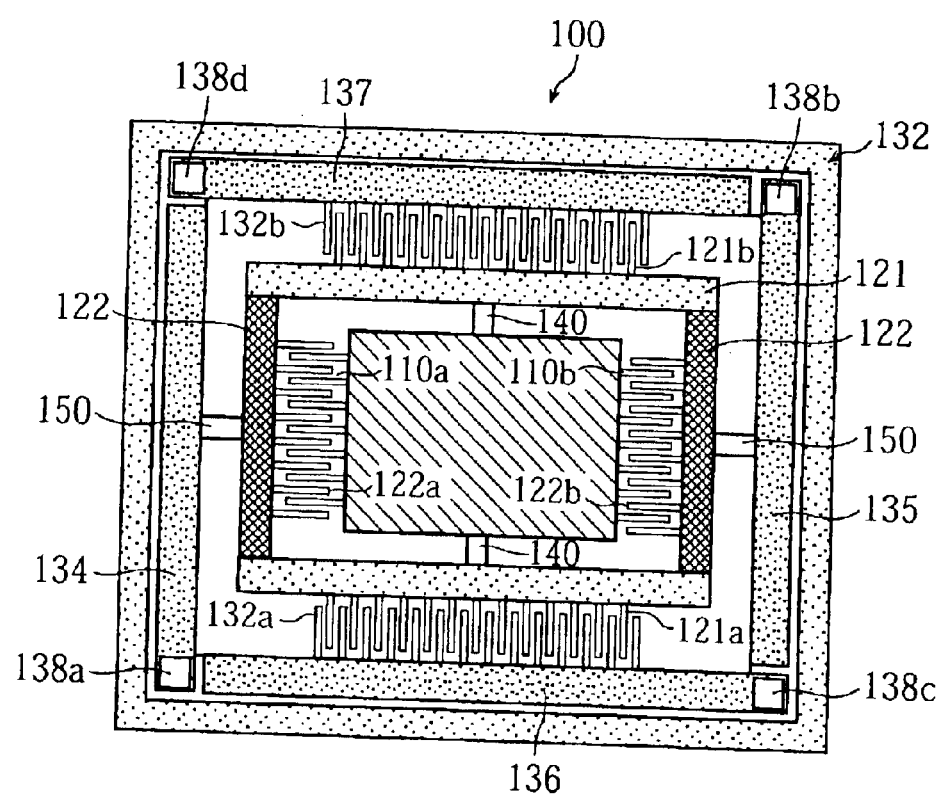
FIG. 4 is a bottom view of the micro mirror unit of FIG. 1.

The outer frame 130 has a multi-layer structure including a first outer frame 131, a second outer frame 132 and an insulating layer between them. The first outer frame 131 and the second outer frame 132 are electrically separated by the insulating layer. As shown in FIG. 4, the second outer frame 132 includes a first island 134, a second island 135, a third island 136 and a fourth island 137, each spaced from others by a gap. The first through the fourth islands 134–137 are formed with electrode pads 138a–138d respectively. The electrode pads 138a–138d are made of Au or Al. The third island 136 and the fourth island 137 are formed with inwardly extending comb-like electrodes 132a, 132b respectively. The comb-like electrodes 132a, 132b are below the comb-like electrodes 121a, 121b of the inner frame main portion 121 respectively, and positioned so as not to interfere with the comb-like electrodes 121a, 121b when the inner frame 120 pivots. The first outer frame 131 originates from the first silicon layer whereas the second outer frame 132 originates from the second silicon layer.

Each of the torsion bars 150 has a multi-layer structure including an upper layer 151, a lower layer 152 and an insulating layer between them. The upper layer 151 and the lower layer 152 are electrically separated by the insulating layer. The upper layer 151 is connected to the inner frame main portion 121 and the first outer frame 131 whereas the lower layer 152 is connected to the electrode bases 122 and the second outer frame 132. The upper layer 151 originates from the first silicon layer whereas the lower layer 152 originates from the second silicon layer.

The wiring substrate 200 has a first surface 201 and a second surface 202. The first surface 201 is formed with a predetermined wiring pattern 210. The wiring pattern 210 includes four electrode pads 211a–211d for establishing internal electrical connections, and four electrode pads 212a–212d for external connections. The electrode pads 211a–211d are formed at locations so as to face the electrode pads 138a–138d respectively. The wiring substrate 200 itself is a substrate having a thickness of 300 $\mu$m and made of silicon, ceramic, etc. The wiring pattern 210 is formed, by first forming a film of metal material on the first surface 201 of the wiring substrate 200, and then patterning the film. The metal material can be provided by Au and Al for example. The film can be formed by spattering, plating, etc.

The spacers 300 are placed between the electrode pads 138a–138d of the micro mirror substrate and the electrode pads 211a–211d of the wiring substrate. According to the present embodiment, each of the spacers 300 includes two ball bumps each made of Au, with one being stuck on the other, one being fused to corresponding one of the electrode pads 211a–211d and the other bonded to corresponding one of the electrode pads 138a–138d with an electroconductive adhesive 303. The two Au ball bumps are fused together by ultrasonic bonding.

According to the micro mirror unit X1 having a structure as described above, when the first outer frame 131 is grounded, the members made of the same silicon material as and formed integrally with the first outer frame 131, i.e. the upper layer 151 of the torsion bars 150, the inner frame main portion 121, the torsion bars 140 and the mirror-formed portion 110 provide an electrical path that grounds the comb-like electrodes 110a, 110b and the comb-like electrodes 121a, 121b. Under this state, by giving a predetermined electric potential to the comb-like electrode 122a or the comb-like electrode 122b thereby generating a static electric force between the comb-like electrode 110a and the comb-like electrode 122a or between the comb-like electrode 110b and the comb-like electrode 122b, it becomes possible to pivot the mirror-formed portion 110 about the pivotal axis A1. Likewise, by giving a predetermined electric potential to the comb-like electrode 132a or the comb-like electrode 132b thereby generating a static electric force between the comb-like electrode 121a and the comb-like electrode 132a or between the comb-like electrode 121b and the comb-like electrode 132b, it becomes possible to pivot the mirror-formed portion 110 about the pivotal axis A2.

As will be understood clearly by referring to FIG. 2 through FIG. 4 altogether, the comb-like electrode 122a can be electrically charged via the electrode pad 212a of the wiring substrate 200, the electrode pad 211a, the spacers 300 thereon, the electrode pad 138a of the micro mirror substrate 100, the first island 134, the lower layer 152 of the torsion bars 150 connected thereto, and the electrode bases 122 connected thereto. The comb-like electrode 122b can be electrically charged via the electrode pad 212b of the wiring substrate 200, the electrode pad 211b, the spacers 300 thereon, the electrode pad 138b of the micro mirror substrate 100, the second island 135, the lower layer 152 of the torsion bars 150 connected thereto, and the electrode bases 122 connected thereto. The comb-like electrode 132a can be electrically charged via the electrode pad 212c of the wiring substrate 200, the electrode pad 211c, the spacers 300 thereon, the electrode pad 138c of the micro mirror substrate 100, and the third island 136. The comb-like electrode 132b can be electrically charged via the electrode pad 212d of the wiring substrate 200, the electrode pad 211d, the spacers 300 thereon, the electrode pad 138d of the micro mirror substrate 100, and the fourth island 137. By giving a predetermined electric charge using the four paths as described, the mirror-formed portion 110 can be oriented in desired directions.

When the mirror-formed portion 110 and/or the inner frame 120 are pivoted by such electrical charges, one of the ends of these moving part deflects toward the wiring substrate 200. For example, assume that the electrode bases 122 of the inner frame 120 has a length L3 of 600 μm. If the inner frame 120 pivots at 5 degrees about the pivotal axis A2, an end of the electrode bases 122 comes lower by 60 μm than where it is when there is no pivotal twist. In order not interfere with such a deflection of the inner frame, the micro mirror substrate 100 and the wiring substrate 200 must be spaced from each other. For this reason, according to the present embodiment, the spacers 300 is given a height of 100 μm for example.

As described, the micro mirror unit X1 has arrangements for reducing the tendency of the micro mirror unit to become large while allowing the moving part of the micro mirror unit to move appropriately. Specifically, the spacers 300 provide electric connection between the electric path formed in the micro mirror substrate 100 and the wiring pattern 210 formed in the wiring substrate 200. At the same time, the spacers 300 provide appropriate spacing between the micro mirror substrate 100 and the wiring substrate 200. Further, the wiring for driving the moving parts, i.e. the mirror-formed portions 110 and the inner frames 120, is not formed in the micro mirror substrate 100 in which the moving parts itself is formed. Hence, size reduction is achieved for the micro mirror substrate 100 and thus for the micro mirror unit X1.

Figure 5:
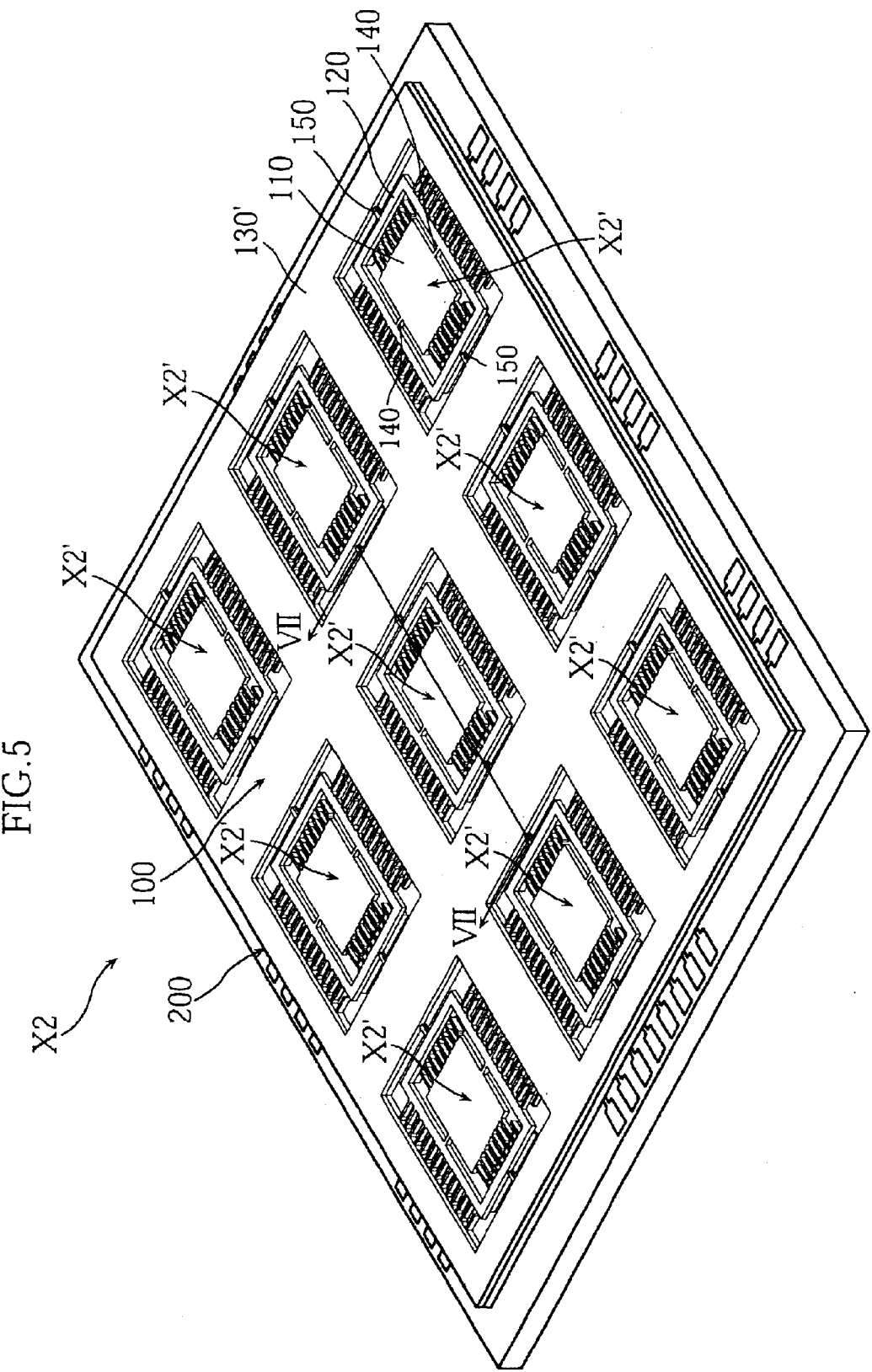
FIG. 5 is a perspective view of a micro mirror unit according to a second embodiment of the present invention.
Figure 6:
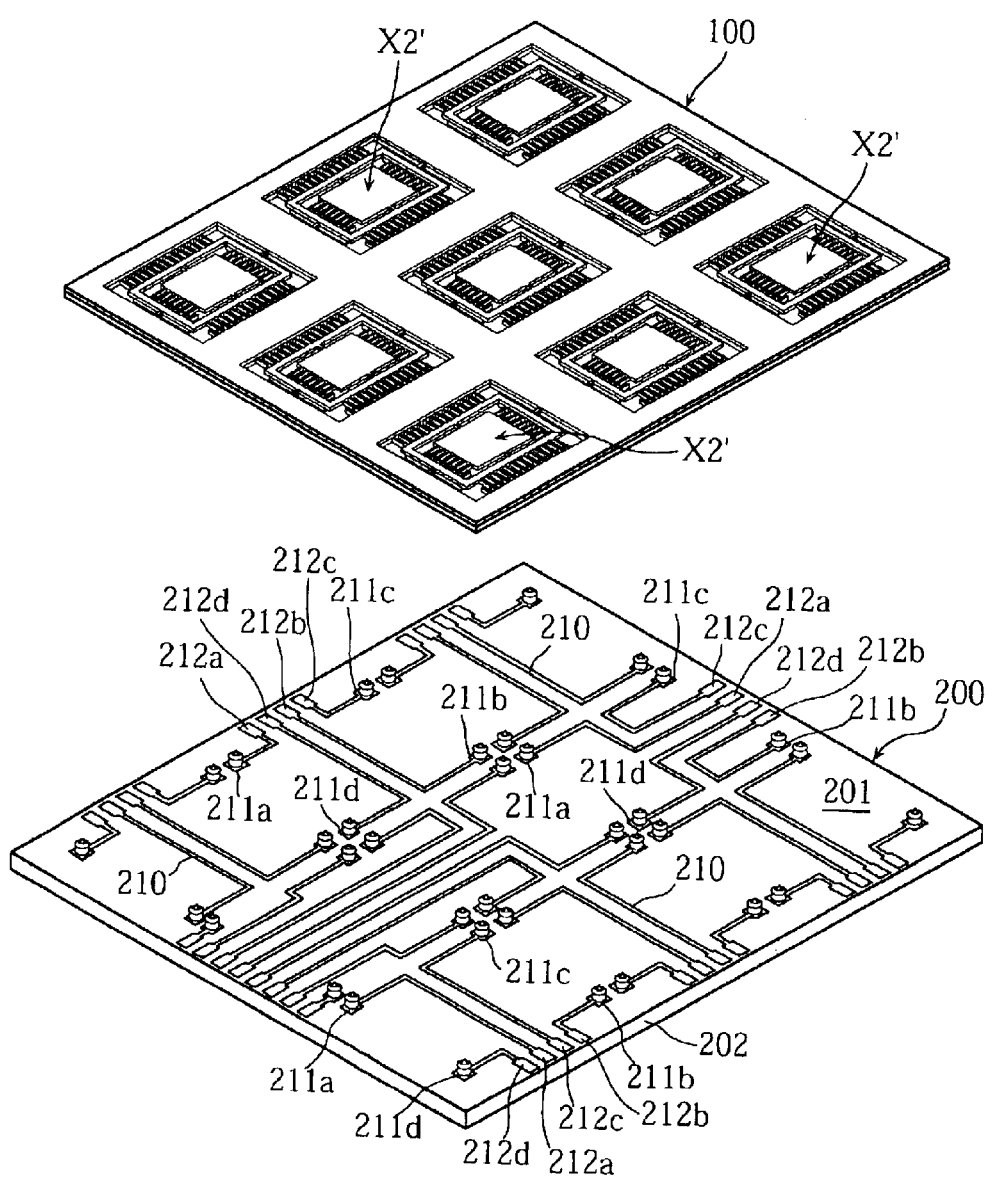
FIG. 6 is an exploded perspective view of the micro mirror unit of FIG. 5.
Figure 7:
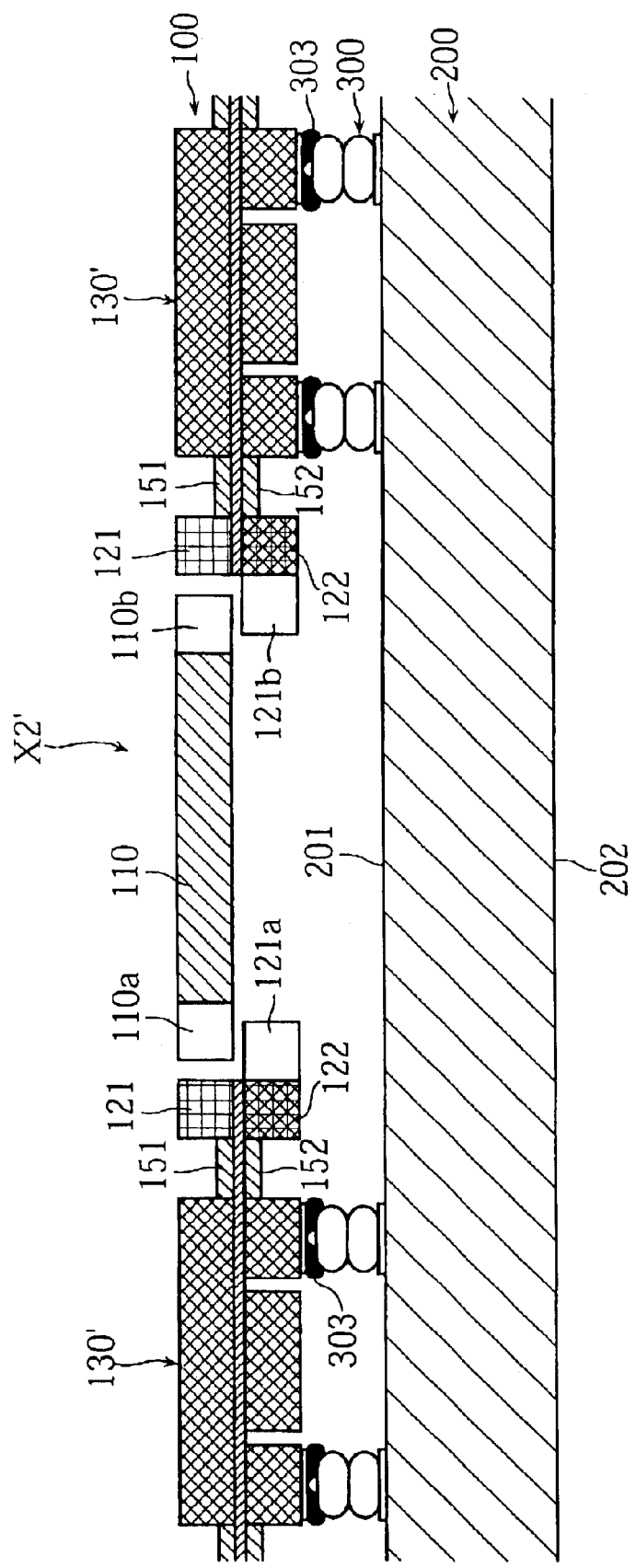
FIG. 7 is a sectional view taken along lines VII—VII in FIG. 5.

FIG. 5 is a perspective view of a micro mirror unit X2 according to a second embodiment of the present invention. FIG. 6 is an exploded perspective view of the micro mirror unit X2. FIG. 7 is a sectional view taken along lines VII—VII in FIG. 5

The micro mirror unit X2 includes a micro mirror substrate 100, a wiring substrate 200, and electroconductive spacers 300 between them. The micro mirror substrate 100 includes a total of nine micro mirror units X2' and a common outer frame 130' surrounding these. Each of the micro mirror units X2' includes a mirror-formed portion 110, an inner frame 120 surrounding it, a pair of torsion bars 140 connecting the mirror-formed portion 110 with the inner frame 120, and a pair of torsion bars 150 connecting the inner frame 120 with the common outer frame 130'. The mirror-formed portion 110, the inner frame 120 and the torsion bars 140, 150 of the micro mirror unit X2' have the same arrangements as those of the micro mirror unit X1. The common outer frame 130' has the same arrangements as the outer frame 130 of the micro mirror unit X1, with respect to each of the micro mirror unit X2'.

The wiring substrate 200 has a first surface 201 and a second surface 202. The first surface 201 is formed with predetermined wiring patterns 210 for driving the micro mirror units X2' independently of each other. Each of the wiring patterns 210 serves one of the micro mirror units X2', and includes four electrode pads 211a–211d for establishing internal connections and four electrode pads 212a–212d for establishing external connections. The electrode pads 211a–211d are faced to the electrode pads 138a–138d formed in each of the micro mirror units X2' respectively. All the other arrangements for the wiring substrate 200 are the same as of the micro mirror unit X1.

The spacers 300 are placed between the electrode pads 138a–138d of the micro mirror substrate and the electrode pads 211a–211d of the wiring substrate. All the other arrangements about the spacers 300 are the same as those in the micro mirror unit X1.

As described, the micro mirror unit X2 essentially includes nine micro mirror units X1 formed together in a single micro mirror substrate 100 and in a single wiring substrate 200. Therefore, according to the micro mirror unit X2, as already described earlier for the micro mirror unit X1, it is possible to drive each of the micro mirror units X2' thereby pivot their respective moving parts, i.e. the mirror-formed portions 110 and the inner frames 120.

As described, the micro mirror unit X2 has arrangements for reducing the tendency of the micro mirror unit to become large, while allowing the moving part of the micro mirror unit to move appropriately. Specifically, according to the micro mirror unit X2, the spacers 300 provides electric connection between the electric path formed in the micro mirror substrate 100 and the wiring pattern 210 formed in the wiring substrate 200. At the same time, the spacers 300 provide appropriate spacing between the micro mirror substrate 100 and the wiring substrate 200. Further, the wiring for driving the moving parts, or the mirror-formed portions 110 and the inner frames 120, is not formed in the micro mirror substrate 100 in which the moving parts themselves are formed. Hence, size reduction has been achieved for the micro mirror substrate 100, and thus for the micro mirror unit X2. According to the present embodiment, the micro mirror substrate 100 is formed with a total of nine micro mirror units X2'. According to the present invention, the same advantages as described for the second embodiment are offered in cases where larger numbers of micro mirror units X2' are formed in the micro mirror substrate 100.

Figure 8:
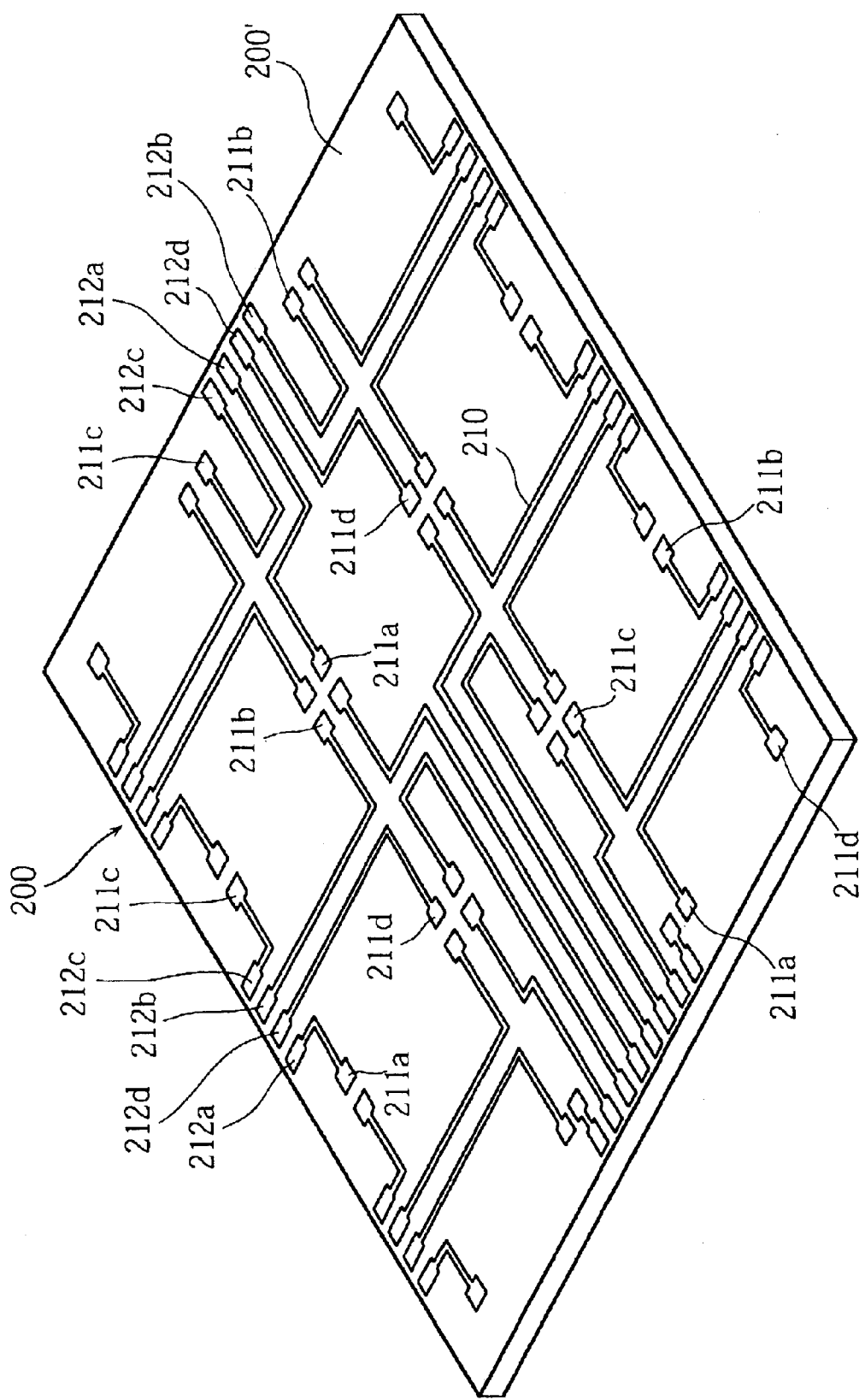
FIG. 8 illustrates one step of the manufacturing procedure of the micro mirror unit of FIG. 5.

FIG. 8 through FIG. 12 show a method of making the micro mirror unit X2. In the manufacture of the micro mirror unit X2, first, as shown in FIG. 8, a wiring pattern 210 is formed on a substrate 200', whereby a wiring substrate 200 is made. Specifically, the substrate 200' is first formed with a film of metal material using a technique such as spattering and plating, and then the metal film is patterned via a predetermined mask. The wiring pattern 210 formed in this step includes the electrode pads 211a–211d, and the electrode pads 212a–212d. The substrate 200' can be made of a semiconductor such as Si, as well as ceramic, glass, etc. The wiring can be formed with such metal material as Au and Al.

Figure 9:
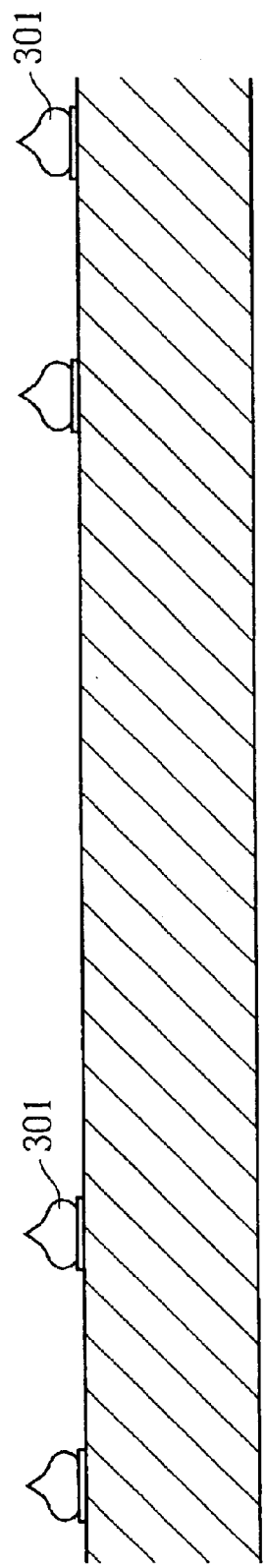

Next, as shown in FIG. 9, ball bumps 301 made of Au are formed on the electrode pads 211a–211d using a wire bonder. Note that description hereinafter will be made with reference to modeled sections of the micro mirror unit X2.

Figure 10:
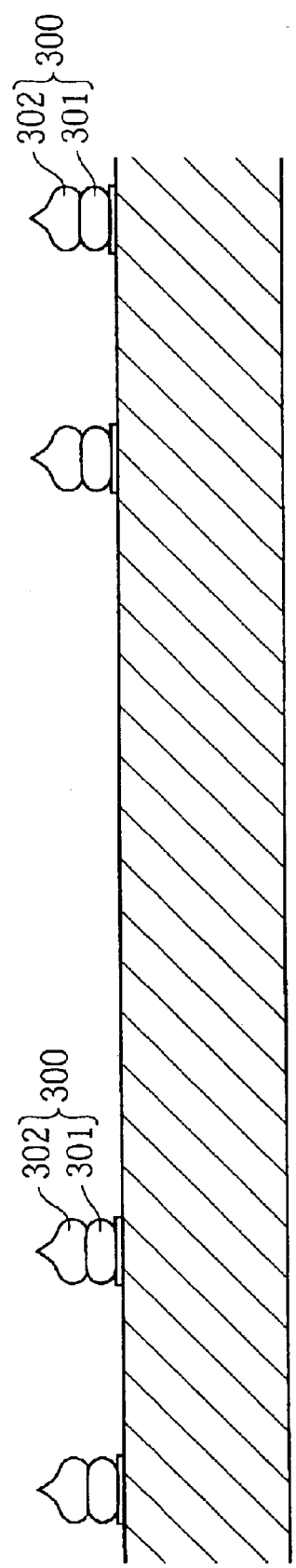

Next, as shown in FIG. 10, ball bumps 302 made of Au are formed on the ball bumps 301 using a wire bonder, whereby electroconductive spacers 300 are formed. In the formation of the ball bumps 301, 302, due to the nature of the wire bonder, small projections are left on top of the ball bumps 301, 302 as shown in FIG. 9 and FIG. 10.

Next, as shown in FIG. 11, leveling is performed so that all the spacers 300 have the same height. Specifically, the projections on top of the ball bumps 302 are pressed onto a flat surface of e.g. a plate of glass so that the projections are flattened and the spacers 300 have the same height. As has been described earlier for the micro mirror unit X1, the moving part including the mirror-formed portion 110 will come lower toward the wiring substrate 200 by e.g. 60 $\mu$m. Thus, in order for the moving part not to contact the wiring substrate 200 when moved, the micro mirror substrate 100 and the wiring substrate 200 must be spaced by e.g. 60 $\mu$m or more. According to the present embodiment, such a desirable space is provided by piling the ball bumps in two tiers. Specifically, the two-tier ball bumps 301, 302 after the leveling step provides electroconductive spacers that gives a distance of e.g. 100 $\mu$m. It should be noted however, that according to the present invention, the number of ball bumps used per electroconductive spacer can be appropriately selected in accordance with the distance required between the micro mirror substrate 100 and the wiring substrate 200.

Next, as shown in FIG. 12, the top portions of the spacers 300, or of the ball bumps 302, are applied with an electroconductive thermosetting adhesive 303. In order to achieve this, for example, the adhesive 303 can be applied evenly on a flat plate to a thickness of 25 $\mu$m, and then this plate is placed onto the wiring substrate 200 with the spacers 300 in between. In such a way, the electroconductive adhesive 303 can be printed onto the top of the spacers 300.

Next, using a flip-chip bonder, the micro mirror substrate 100 and the wiring substrate 200 so far made separately are aligned with each other. The micro mirror substrate 100 is placed on the wiring substrate 200, and then, as shown in FIG. 7, under a pressure and heat, the micro mirror substrate 100 and the wiring substrate 200 are bonded with each other with the spacers 300 in between. In this step, the electroconductive adhesive 303 hardens thereby bonding the spacers 300 to the electrode pads 138a–138d of the micro mirror substrate 100. As a result, the wiring pattern 210 of the wiring substrate 200 is electrically connected with the electrode pads 138a–138d of the micro mirror substrate 100. This is how the micro mirror unit X2 is manufactured.

Figure 13:
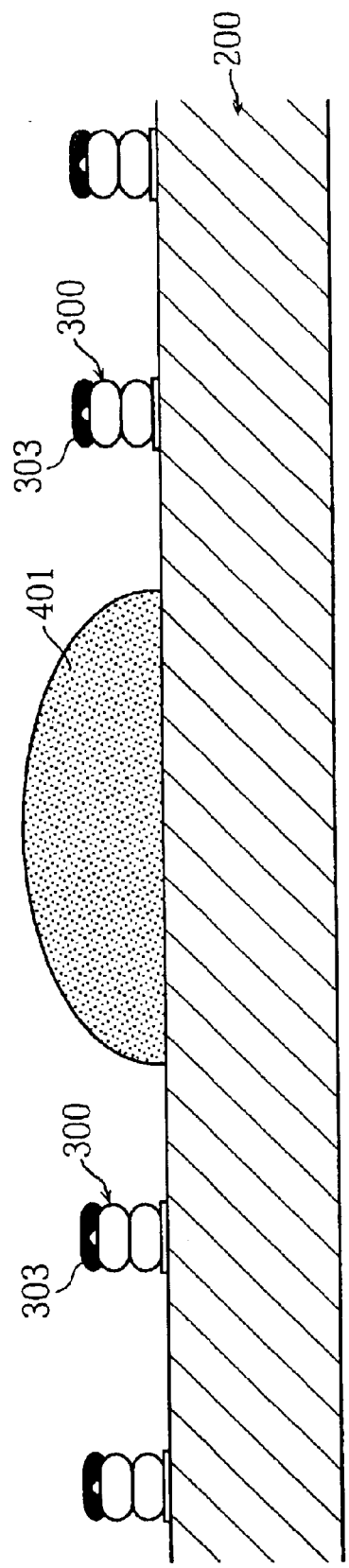
Figure 14:
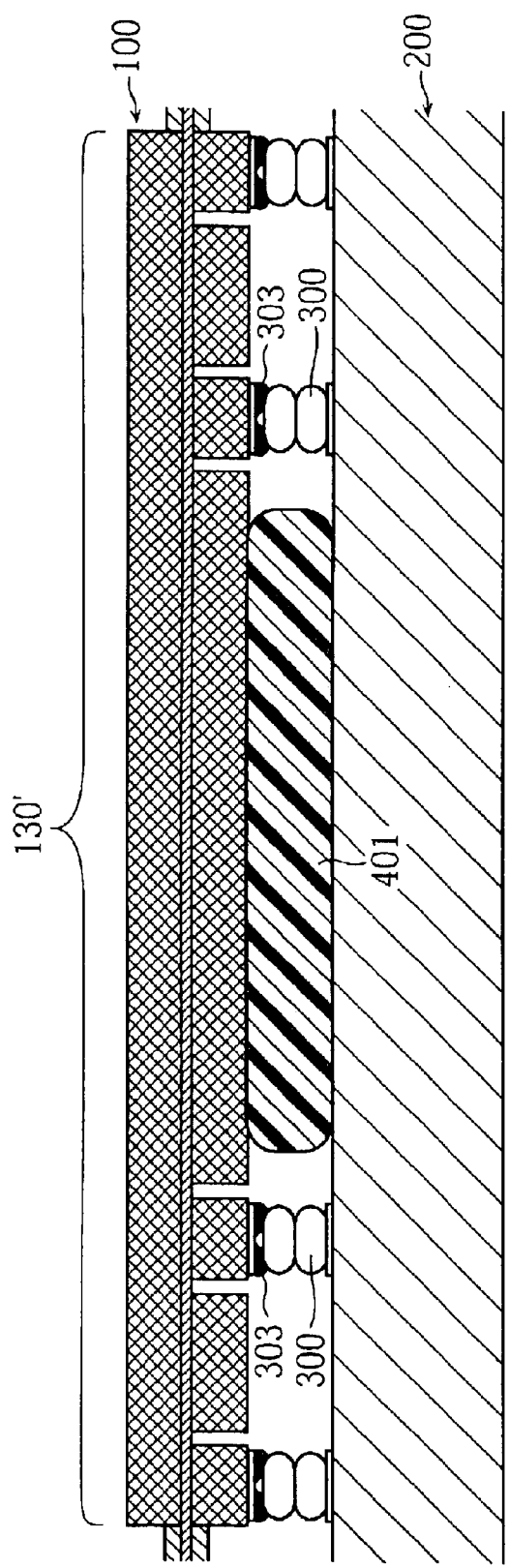

FIG. 13 and FIG. 14 show alternative steps which can follow the steps in FIG. 12. First, in the step shown in FIG. 13, the wiring substrate 200 which have undergone the step shown in FIG. 12 is applied with a thermosetting adhesive 401. The adhesive 401 can be provided by an epoxy adhesive for example. The adhesive 401 is applied, by a predetermined amount, not to cover the spacers 300 and to predetermined places on the wiring substrate 200 which are to face the common outer frame 130' of the micro mirror substrate 100.

Next, as shown in FIG. 14, using a flip-chip bonder, the micro mirror substrate 100 and the wiring substrate 200 so far made separately are aligned with each other. The micro mirror substrate 100 is placed on the wiring substrate 200, and then, as shown in FIG. 7, under a pressure and heating, the micro mirror substrate 100 and the wiring substrate 200 are bonded with each other with the spacers 300 in between. In this step, the electroconductive adhesive 303 hardens thereby bonding the spacers 300 to the electrode pads 138a–138d of the micro mirror substrate 100. As a result, the wiring pattern 210 of the wiring substrate 200 is electrically connected with the electrode pads 138a–138d of the micro mirror substrate 100. When the micro mirror substrate 100 is placed on the wiring substrate 200, adhesion provided by the adhesive 401 loosely fixes the micro mirror substrate 100 onto the wiring substrate 200. After the adhesive 401 is hardened between the common outer frame 130' of the micro mirror substrate 100 and the wiring substrate 200 due to the pressure and the heat applied, the adhesive 401 helps the micro mirror substrate 100 and the wiring substrate 200 held together. The micro mirror unit X2 can also be manufactured in this way.

Figure 15:
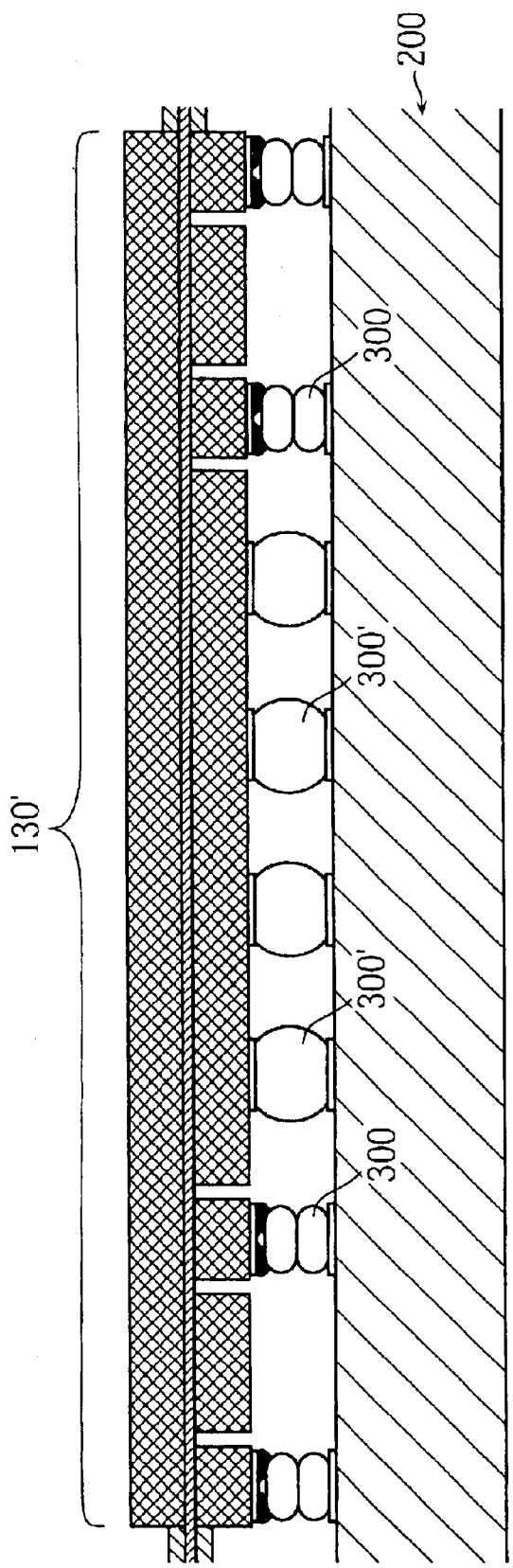
FIG. 15 is a sectional view showing additional spacers provided between the micro mirror substrate and the wiring substrate.
Figure 16:
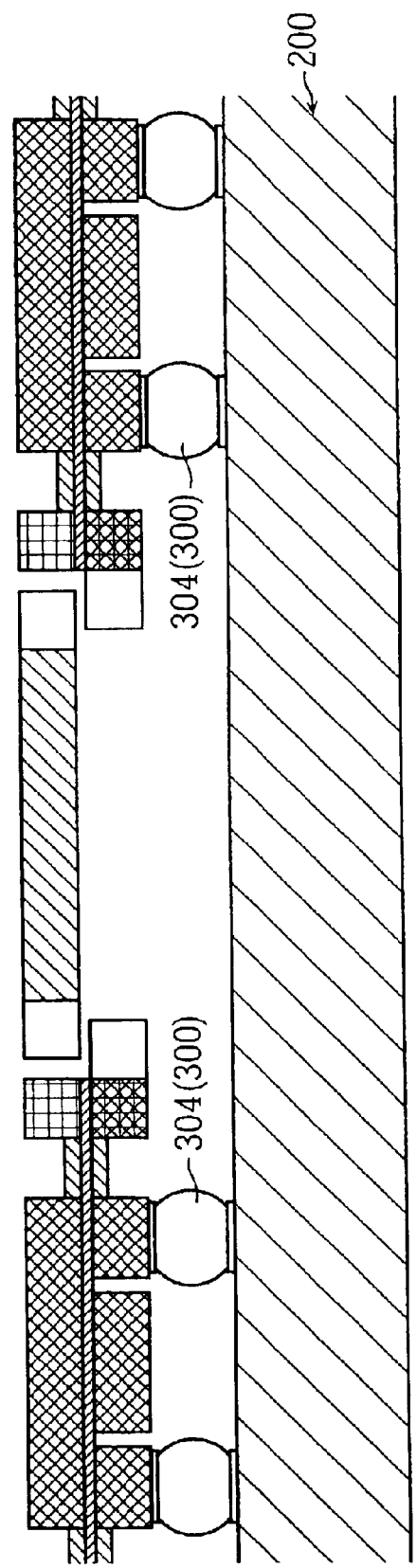
FIG. 16 shows a different arrangement of electroconductive spacers.

In the micro mirror unit X2, as shown in FIG. 15, additional spacers 300' may be formed between the micro mirror substrate 100 and the wiring substrate 200. In this case, the additional spacers 300' are formed between the common outer frame 130' of the micro mirror substrate 100 and the wiring substrate 200. The additional spacers 300' can be provided by solder bump, plated metal, dry film resist, glass, resin ball spacers, etc. If the additional spacers 300' are formed of a metal material such as solder, it is preferable that metal pads are formed in advance on the common outer frame 130' and the wiring substrate 200, at places where the additional spacers are to be formed. This is to obtain sufficient bonding strength of the spacers 300 with the common outer frame 130' and the wiring substrate 200. Further, when the additional spacers 300' are formed of a metal material such as solder, formation of the additional spacers 300' is performed so that the additional spacers 300' will not short-circuit the wiring pattern 210 on the wiring substrate 200 with the electric path formed on the micro mirror substrate 100.

Bonding of the spacers 300 to the electrode pads 211a–211d and/or the electrode pads 138a–138b may be achieved in ultrasonic bonding between the Au pad and the Au bump as an alternative to the method described earlier. As another alternative, there may only be a press-contact between the pads and the spacers 300. In this case, the mechanical bonding between the micro mirror substrate 100 and the wiring substrate 200 is achieved elsewhere e.g. by the adhesive 401 shown in FIG. 14 applied at other places. The spacers 300 provided by the Au bump balls 301, 302 may instead be provided by single-bead solder bumps 304. By using a plating technique or a screen printing technique with selected material for the formation of the solder bumps on the electrodes, it is possible to form the spacers 300 made of single-bead solder bumps 304.

Figure 17:
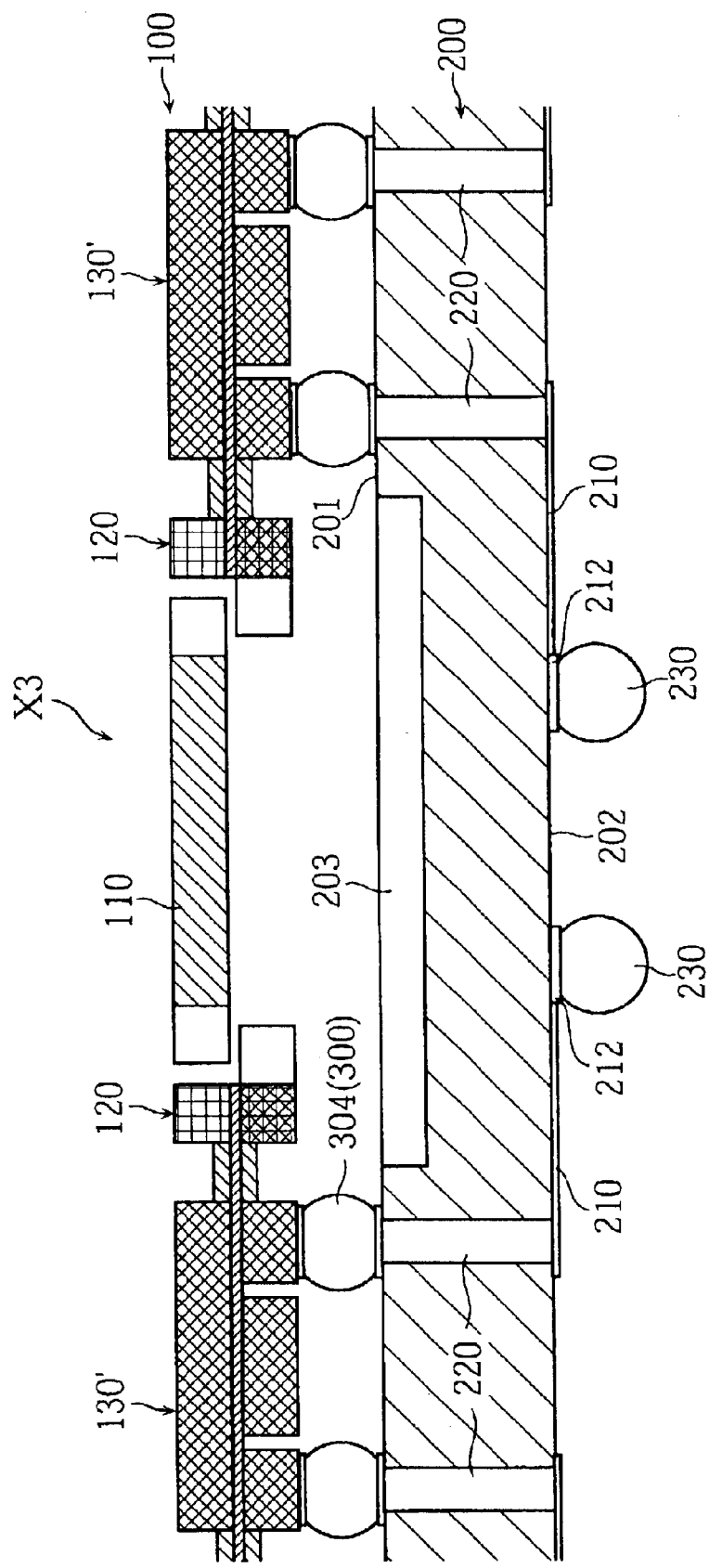
FIG. 17 is a fragmentary sectional view showing a micro mirror unit according to a third embodiment of the present invention.
Figure 18:
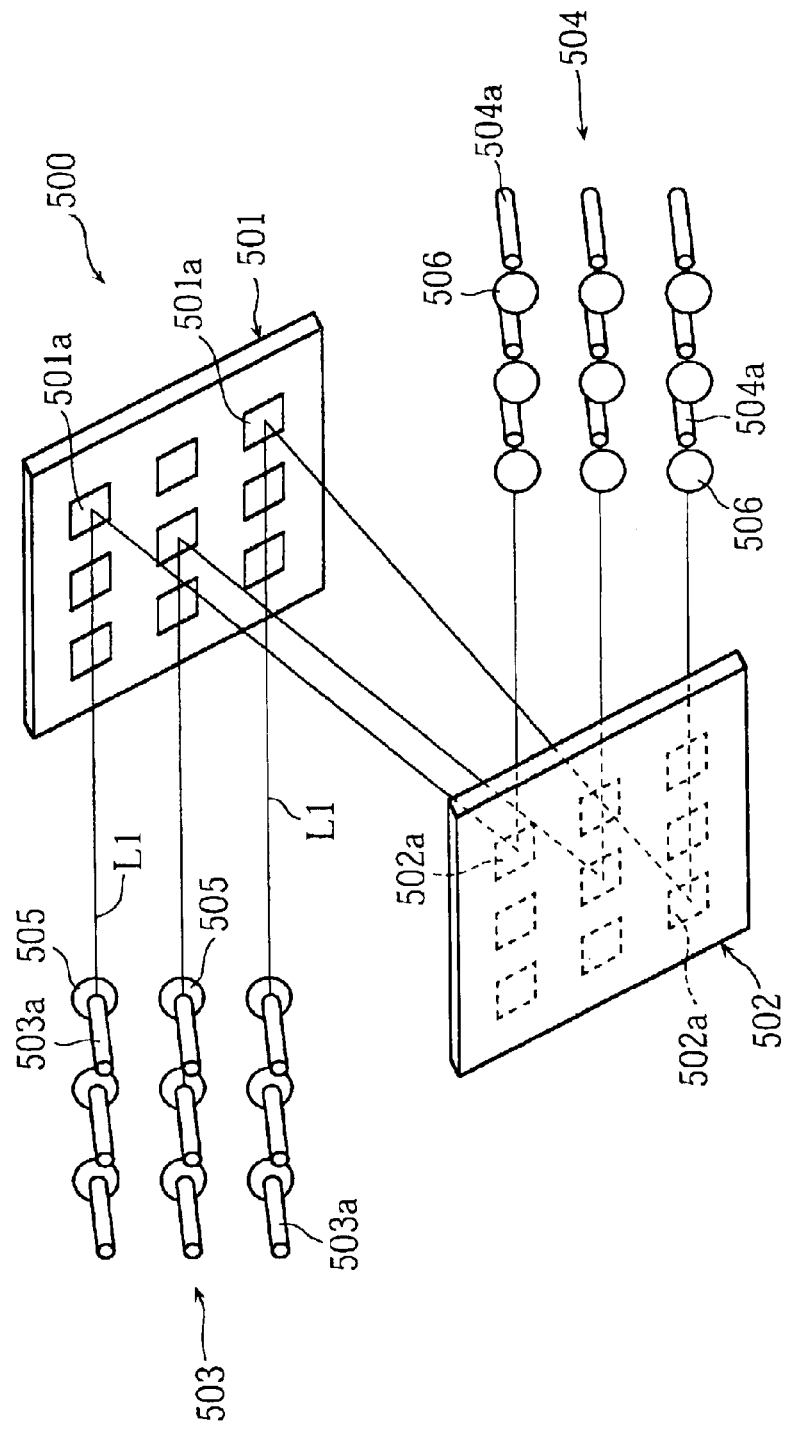
FIG. 18 illustrates a conventional optical switching device.

FIG. 17 is a fragmentary sectional view of a micro mirror unit X3 according to a third embodiment of the present invention. The micro mirror unit X3 includes a wiring substrate 200 which uses a different arrangement from that of the micro mirror unit X2, but includes the same micro mirror substrate 100 and electroconductive spacers 300 as those used in the micro mirror unit X2. However, in the present embodiment, the electroconductive spacers 300 are provided by the single-bead solder bumps 304.

The wiring substrate 200 of the micro mirror unit X3 has a first surface 201 and a second surface 202. The first surface 201 is formed with a retrieved portion 203. The retrieved portion 203 is formed at a place and to a depth so as to accommodate the mirror-formed portion 110 and the inner frame 120 of the micro mirror substrate 100. Since the retrieved portion 203 is formed as described, the spacers 300 of the micro mirror unit X3 can have a height shorter than the height required of the spacers 300 in the micro mirror unit X1 and the micro mirror unit X2 that use the same mirror-formed portion 110 and the inner frame 120. Thus, the single-bead solder bumps 304 of a relatively small height can serve sufficiently as the spacers 300.

The formation of the retrieved portion 203 decreases the region for the formation of the wiring pattern 210 on the first surface 201 of the wiring substrate 200. In order to compensate for this, in the micro mirror unit X3, a wiring pattern 210 is formed also on the second surface 202 of the wiring substrate 200. With this arrangement, the wiring pattern 210 in the first surface 201 and the wiring pattern 210 in the second surface 202 are electrically connected with each other by an electrical conductor 220 which penetrates the wiring substrate 200. The wiring pattern 210 in the first surface 201 may only include the electrode pads 211a–211d to be contacted by the spacers 300. The wiring pattern 210 in the second surface 202 includes the electrode pads 212a–212d for external connections. The electrode pads 212 include, for example, solder bumps 230 for external connections.

According to the first through the third embodiments described above, the micro mirror has two pivotal axes and the electrodes have a comb-like structure. The present invention, however, may also be applied to other types of micro mirrors such as the flat-and-parallel type. Further, according to the method of making the micro mirror unit X2 described earlier, the spacers 300 are formed on the wiring substrate 200 before the micro mirror substrate 100 is bonded to the wiring substrate 200. However, according to the present invention, the spacers 300 may be formed on the wiring substrate 200 before the micro mirror substrate 100 is bonded to the wiring substrate 200. As another alternative, both of the substrates may be formed with part of the spacers 300 and the spacers 300 may be completed at the bonding between the micro mirror substrate 100 and the wiring substrate 200. The micro mirror units X1, X3 can also be manufactured in the same methods of manufacture as described for the micro mirror unit X2, including alternative methods described here above.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A micro mirror unit comprising:
   a micro mirror substrate that includes a mirror-formed portion, a first frame surrounding the mirror-formed portion, first torsion bars connecting the mirror-formed portion to the first frame, second frame surrounding the first frame, and second torsion bars connecting the first frame to the second frame;
   a wiring substrate formed with a wiring pattern; and
   a plurality of electroconductive spacers for electrically connecting the micro mirror substrate to the wiring pattern and for spacing the micro mirror substrate and the wiring substrate apart from each other;
   wherein the second frame includes a plurality of electroconductive islands electrically separated from each other, each of the electroconductive spacers being connected to a respective one of the electroconductive islands.

2. A micro mirror unit comprising:
   a micro mirror substrate including a plurality of mirror-formed portions, a plurality of frames each surrounding a respective one of the mirror-formed portions, first torsion bars connecting each of the mirror-formed portions to a respective one of the first frames, a second frame surrounding each of the first frames, and second torsion bars connecting each of the first frames to the second frame;
   a wiring substrate formed with a wiring pattern; and
   a plurality of electroconductive spacers for electrically connecting the micro mirror substrate to the wiring pattern and for spacing the micro mirror substrate and the wiring substrate apart from each other,
   wherein the second frame includes, for each of the first frames, a plurality of electroconductive islands electrically separated from each other, each of the electroconductive spacers being connected to a respective one of the electroconductive islands.

3. The micro mirror unit according to claim 1, wherein each of the electroconductive spacers comprises either one of a single bump and a plurality of bumps stacked one on another thicknesswise to the micro mirror substrate.

4. The micro mirror unit according to claim 1, wherein each of the electroconductive spacers is connected to at least one of the wiring pattern and said respective one of the electroconductive islands via an electrode pad.

5. The micro mirror unit according to claim 1, wherein each of the electroconductive spacers is connected to at least one of the wiring pattern and said respective one of the electroconductive islands via an electroconductive adhesive.

6. The micro mirror unit according to claim 4, wherein each of the electroconductive spacers and the electrode pad are fused to each other.

7. The micro mirror unit according to claim 4, wherein each of the electroconductive spacers and the electrode pad are press-contacted with each other.

8. The micro mirror unit according to claim 1, wherein the wiring substrate has a first surface facing the micro mirror substrate, the first surface being formed with a retreated portion for accommodation of each of the mirror-formed portions.

9. The micro mirror unit according to claim 8, wherein the wiring substrate has a second surface opposite to the first surface, the second surface being formed with part of the wiring pattern.

10. The micro mirror unit according to claim 9, wherein the wiring substrate includes an electrical conductor penetrating through the wiring substrate for electrical connection between the wiring pattern formed in the first surface and the wiring pattern formed in the second surface.

11. The micro mirror unit according to claim 1, further comprising an adhesive intervening between the micro mirror substrate and the wiring substrate.

12. The micro mirror unit according to claim 1, further comprising an additional spacer intervening between the second frame and the wiring substrate.

13. The micro mirror unit according to claim 12, wherein the additional spacer comprises a bump.

14. The micro mirror unit according to claim 1, wherein each of the mirror-formed portions is provided with a first comb-like electrode each of the first frames being provided with a second comb-like electrode for operation of the the mirror-formed portion by electrostatic force generated between the first and the second comb-like electrodes.

15. The micro mirror unit according to claim 1, wherein the second torsion bars extend perpendicularly to a direction in which the first torsion bars extend.

16. The micro mirror unit according to claim 14, wherein each of the first frames includes a third comb-like electrode, the second frame including, for each of the first frames, a fourth comb-like electrode for operation of the first frame by electrostatic force generated between the third and the fourth comb-like electrodes.

17. The micro mirror unit according to claim 1, wherein the micro mirror substrate includes a plurality of divisions insulated from each other by at least one of an insulating film and a gap.

18. A micro mirror unit comprising:

a micro mirror substrate mounted on a wiring substrate via a plurality of electrically separated electroconductive spacers, the micro mirror substrate including a mirror portion surrounded sequentially by first and second frames, the mirror portion and first and second frames being rotatably connected by first and second torsion bars, respectively, wherein the second frame has a plurality of electroconductive islands each electrically connected to a respective one of the electroconductive spacers.

* * * * *

UNITED STATES PATENT AND TRADEMARK OFFICE
CERTIFICATE OF CORRECTION

PATENT NO. : 6,806,992 B2
DATED : October 19, 2004
INVENTOR(S) : Hiromitsu Soneda et al.

It is certified that error appears in the above-identified patent and that said Letters Patent is hereby corrected as shown below:

Column 11,
Line 50, insert -- a -- after "frame,"

Column 12,
Line 58, insert -- , -- after "electrode"

Signed and Sealed this

Nineteenth Day of April, 2005

JON W. DUDAS
*Director of the United States Patent and Trademark Office*